(12) United States Patent
Reed, Sr.

(10) Patent No.: US 11,472,346 B2
(45) Date of Patent: Oct. 18, 2022

(54) MODULAR AUTOMOTIVE SIDE BODY STORAGE ASSEMBLY

(71) Applicant: Dorian Reed, Sr., Las Vegas, NV (US)

(72) Inventor: Dorian Reed, Sr., Las Vegas, NV (US)

( * ) Notice: Subject to any disclaimer, the term of this patent is extended or adjusted under 35 U.S.C. 154(b) by 35 days.

(21) Appl. No.: 17/249,098

(22) Filed: Feb. 19, 2021

(65) Prior Publication Data

US 2021/0261064 A1 Aug. 26, 2021

Related U.S. Application Data

(60) Provisional application No. 62/979,502, filed on Feb. 21, 2020.

(51) Int. Cl.
| | |
|---|---|
| *B60R 9/02* | (2006.01) |
| *B60Q 1/32* | (2006.01) |
| *H01Q 1/32* | (2006.01) |
| *E05B 83/16* | (2014.01) |
| *E05B 63/00* | (2006.01) |

(52) U.S. Cl.
CPC .............. *B60R 9/02* (2013.01); *B60Q 1/32* (2013.01); *E05B 83/16* (2013.01); *H01Q 1/3283* (2013.01); *E05B 63/0013* (2013.01)

(58) Field of Classification Search
CPC ..... B60R 9/02; B60R 9/55; B60R 2011/0019; B60R 2011/0043; B60Q 1/32
See application file for complete search history.

(56) References Cited

U.S. PATENT DOCUMENTS

| | | | | |
|---|---|---|---|---|
| 1,239,021 | A * | 9/1917 | McBurney | B60R 9/02 224/487 |
| 3,766,373 | A * | 10/1973 | Hedgewick | F21S 43/51 362/235 |
| 6,030,018 | A * | 2/2000 | Clare | B60J 10/24 224/404 |
| 6,685,349 | B2 * | 2/2004 | Schmidt | B60Q 1/32 362/240 |
| 10,629,016 | B1 * | 4/2020 | Helm | B60R 9/065 |
| 2013/0176182 | A1 * | 7/2013 | Stolz | B23P 19/00 29/428 |
| 2014/0132022 | A1 * | 5/2014 | Espig | B60J 7/1657 296/37.7 |

(Continued)

*Primary Examiner* — Julie A Bannan
(74) *Attorney, Agent, or Firm* — Dunlap Bennett & Ludwig, PLLC; Anna L. Kinney

(57) ABSTRACT

A modular side storage assembly for use on automotive bodies includes at least one door storage compartment module and at least one rear fender storage compartment module. The door storage compartment module has an internal sidewall, a horizontal base, and a curved external sidewall, joined with a rearward facing sidewall. The curved external sidewall meets the internal sidewall and forms a curved forward facing sidewall. A hinged hatch is attached to the external sidewall. The rear fender storage compartment module has an internal sidewall, a horizontal base, and a curved external sidewall joined by a forward facing sidewall. The curved external sidewall meets the internal sidewall and forms a curved rearward facing sidewall. An assembly includes front and rear door storage compartments; front fender guards; marker lights; a lockable storage panel cap and an antenna mount; and side steps with embedded LEDs. The assemblies are aerodynamic and easy to use.

14 Claims, 4 Drawing Sheets

(56) References Cited

U.S. PATENT DOCUMENTS

2015/0175059 A1* 6/2015 Dellock .................. F21S 41/16
  362/510
2016/0362143 A1* 12/2016 Erickson .............. B62D 25/163

* cited by examiner

MODULAR AUTOMOTIVE SIDE BODY STORAGE ASSEMBLY

CROSS-REFERENCE TO RELATED APPLICATION

This application claims the benefit of priority of U.S. provisional application No. 62/979,502, filed Feb. 21, 2020, the contents of which are herein incorporated by reference.

BACKGROUND OF THE INVENTION

The present invention relates to storage devices and, more particularly, to modular, automotive side body storage devices.

Pickup trucks, small SUVs, and some cars have very limited storage space. Pickup trucks have almost no enclosed storage space. Storage space that is enclosed requires additional effort and time to access the stored contents, particularly when dealing with a heavy tailgate and tied down contents.

For pickup trucks, the only currently available device to provide additional storage is a set of tie-downs which are very inconvenient and not user-friendly. Other storage compartments for pickup trucks tend to be bulky, requiring additional space, thus defeating the purpose.

Body side units are easily accessible, are conveniently located, and can easily store small items that would not be practical to put in the back of a pickup truck, small car, or SUV. However, they are very inconvenient, requiring skill to operate and install. They require physical stamina and the ability to lift heavy tailgates or trunk lids to use or operate.

As can be seen, there is a need for a device that provides additional storage space that is easily accessible and convenient.

The present invention provides a modular storage assembly for additional storage, e.g., for pickup trucks, small SUVs, and small cars. The storage assembly may be easily accessed and is generally both aesthetically pleasing and aerodynamic.

SUMMARY OF THE INVENTION

In one aspect of the present invention, a modular side storage assembly is provided for use on an automotive body, comprising at least one door storage compartment module having a first internal sidewall, a first horizontal base, and a curved first external sidewall rising therefrom to meet the first internal sidewall and extending forwardly to form a curved first forward facing sidewall, with a first rearward facing sidewall joining the first internal sidewall, the first horizontal base, and the first curved external sidewall; a hatch hingeably attached to the first curved external sidewall at an aperture therein; and at least one rear fender storage compartment module having a second internal sidewall, a second horizontal base, a second curved external sidewall rising therefrom to meet the second internal sidewall and extending rearwardly to form a curved second rearward facing sidewall; and a second forward facing sidewall joining the second internal sidewall, the second horizontal base, and the second curved external sidewall.

In another aspect of the present invention, a modular side storage assembly for use on an automotive body comprising two front fender guards; two front door storage compartment modules having a first internal sidewall coupled to a first horizontal base and a curved first external sidewall rising from the first horizontal base to meet the first internal sidewall and extending forwardly to form a curved first forward facing sidewall with a marker light positioned therein, with a first rearward facing sidewall joining the first horizontal base, and the first curved external sidewall; two rear door storage compartment modules having a second internal sidewall coupled to a second horizontal base and a second curved external sidewall rising from the second horizontal base to meet the second internal sidewall, with a second forward facing sidewall and a second rearward facing sidewall joining the second horizontal base, and the second curved external sidewall; a hatch hingeably attached to each of the first and second curved external sidewalls at an aperture therein; and two rear fender storage compartment modules having a third internal sidewall, a third horizontal base, a third curved external sidewall rising therefrom to meet the third internal sidewall and extending rearwardly to form a curved third rearward facing sidewall with a marker light positioned therein; and a third forward facing sidewall joining the third internal sidewall, the third horizontal base, and the third curved external sidewall; a lockable storage panel cap removably attached to each rear fender storage compartment; an antenna mount extending upwardly from each rear fender storage compartment; and two side steps with a plurality of LEDs embedded therein.

These and other features, aspects and advantages of the present invention will become better understood with reference to the following drawings, description, and claims.

DETAILED DESCRIPTION OF THE INVENTION

Figure 1:
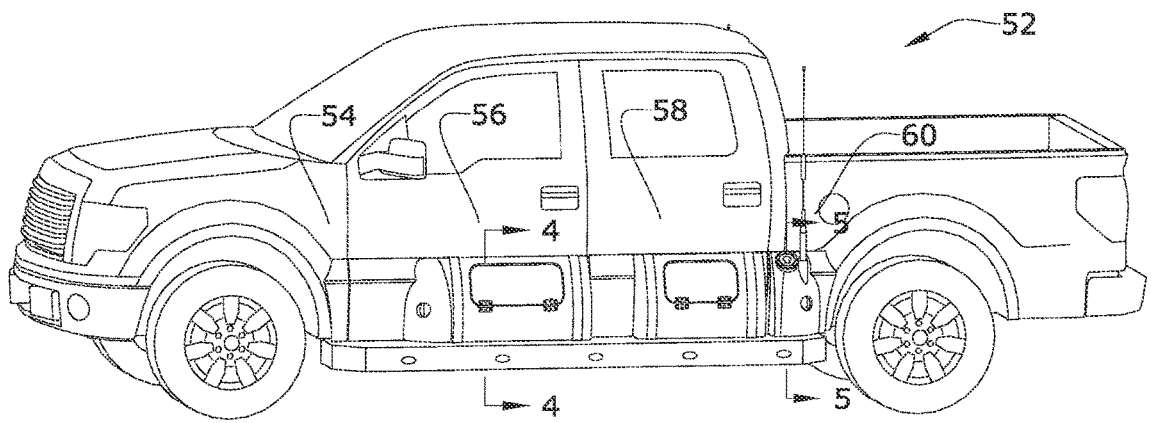
FIG. 1 is a perspective view of an automotive side body storage assembly, according to an embodiment of the present invention.
Figure 2:
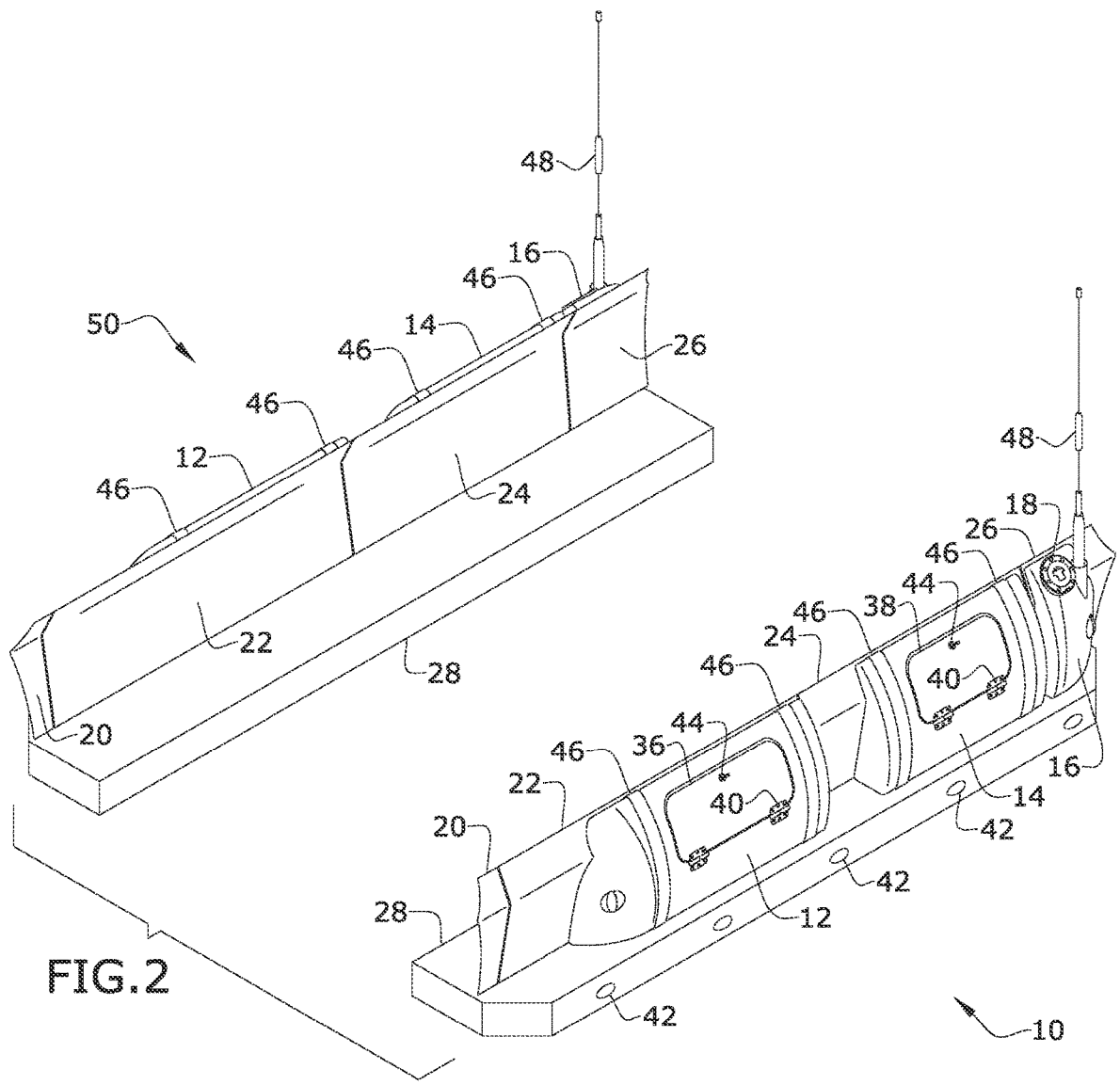
FIG. 2 is another perspective view thereof.
Figure 3:
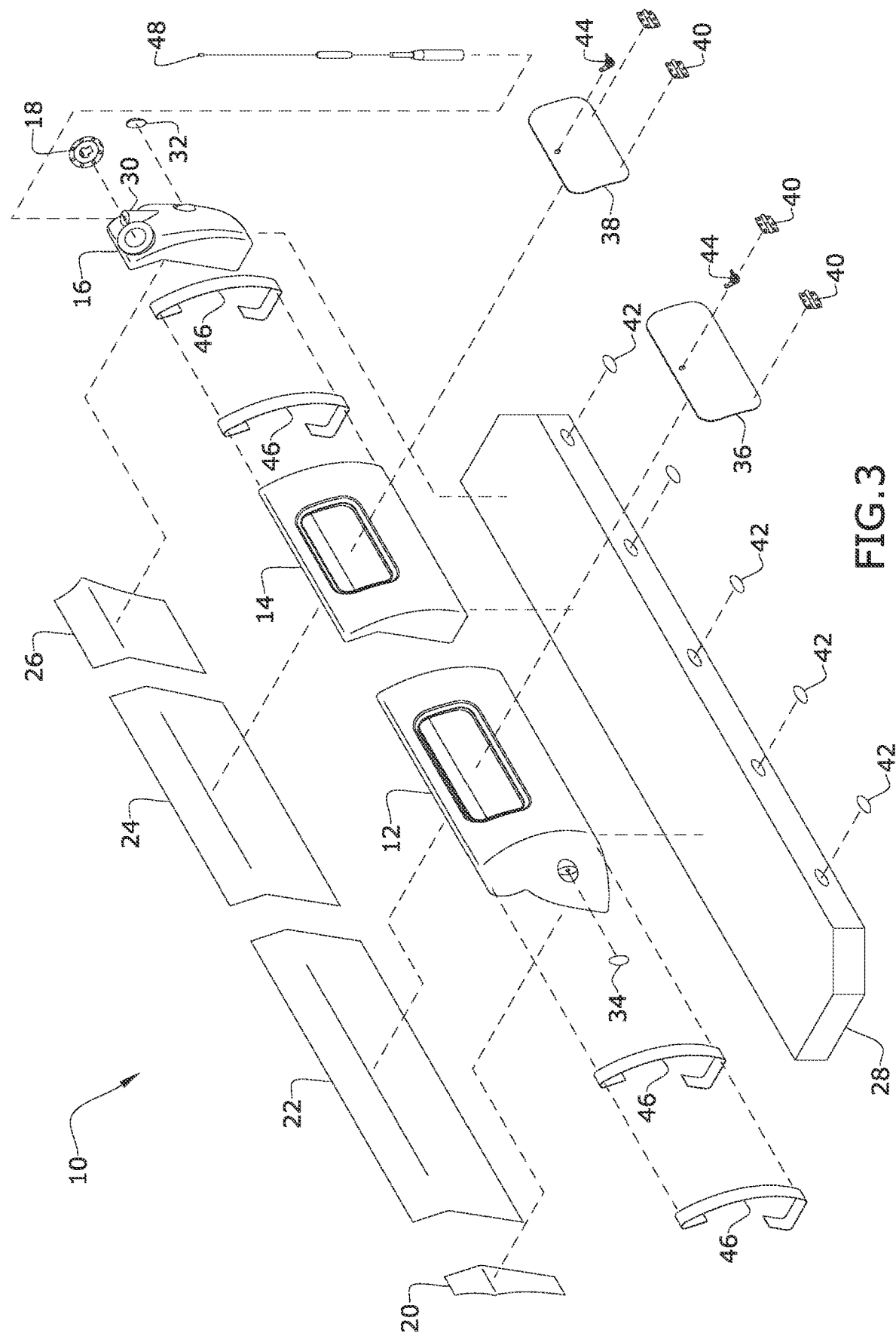
FIG. 3 is an exploded view thereof.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a modular automotive body side storage assembly.

The inventive storage assembly may have a storage compartment module for each vehicle door, as well as a storage compartment module for each rear fender. A fender guard module or guard may also be provided for attachment to each front fender. Each door module is preferably independently mounted from the remainder of the assembly so that the truck doors may swing unimpeded. The compartments may be dimensioned accordingly. A forward-facing sidewall of each front door-mounted compartment may have a curved surface to reduce aerodynamic drag. Each storage module may be mounted to a truck, for example, by way of hardware through mounting holes.

In some embodiments, a lighting device may be provided inside of each container.

In some embodiments, energy production devices such as solar panels and/or wind turbines may be provided on the storage assembly to produce energy.

In some embodiments, the compartments may each have compartment hatch hingedly attached, such that the hinges are hidden from exterior view.

In some embodiments, some or all of the externally facing components may have rounded edges to reduce aerodynamic drag. Generally, some or all of the modular components have a curved external sidewall. Preferably, all compartments extend the same distance from the truck so that the outermost compartment surfaces are parallel to minimize drag.

In some embodiments, the component surfaces positioned adjacent to the truck conform to the respective truck surface.

In some embodiments, the assembly may have a lockable storage panel cap.

The storage assembly may be used to store a multitude of items conveniently and safely, such as emergency kits, food, water, shelter items, survival equipment, toys, picnicking equipment, sports gear, work tools, etc. The user may open a container hatch and insert any item that will fit, then close the container hatch. A locking system may be provided to securely lock the hatches in place. To remove items, the user may open the open the container hatch by means of a locking system and remove any of the contents.

The materials of manufacture and the method of manufacture are not particularly limited. For example, the side step may be made from any suitable sheet metal. The compartments may be made from sheet metal, injection molded plastic, or shaped extruded plastic. The components of the storage assembly may be painted or dyed to any predetermined color and may have chrome surfaces. In some cases, a foil may be wrapped to the truck.

Referring to FIGS. 1 through 5, FIG. 2 shows a pair of mirror-image storage assemblies 10, 50 according to an embodiment of the present invention. Each assembly 10, 50 as shown includes a front fender piece 20, a front door piece 22, a rear door piece 24, and a rear fender piece 26 rising substantially vertically from a horizontal side step 28. These pieces are sometimes referred to herein as internal sidewalls. Extending laterally from each front door piece 22 is a first storage compartment 12 with a first compartment hatch 36. The first compartment hatch 36 lockably closes an aperture within the first storage compartment 12. Extending laterally from each rear door piece 24 is a second storage compartment 14 with a second compartment hatch 38. The second compartment hatch 38 lockably closes an aperture within the second storage compartment 14. The storage compartments 12, 14 have a substantially planar horizontal base, a curved exterior wall, and at least one vertical sidewall that conforms to the exterior surface of the respective door piece 22, 24. The curved exterior wall of each first storage compartment 12 extends to form a curved forward surface adjacent to the front fender piece 20. The curved forward surface conforms to the exterior surface of the door piece 22. The compartment hatches 36, 38 are hingedly attached to the storage compartments 12, 14 with hinges 40 and are positioned between a pair of vertical straps 46 that hold each compartment 12, 14 securely to its respective door piece 22, 24. The compartment hatches 36, 38 have a curved surface that conforms with the curved exterior wall of the respective storage compartment. The compartment hatches 36, 38 may be locked or unlocked with keyed camlocks 44. The first storage compartment 12 may have a light 34 (e.g., an amber light) embedded within a surface adjacent to the front fender piece 20, sometimes referred to herein as the forward facing sidewall. The rear fender piece 26 is shown with a third storage compartment 16 extending laterally therefrom with a substantially planar horizontal base, a substantially planar vertical forward surface, a curved outer wall that curves to form a rearward surface with a portion that conforms to the rear fender piece 26. The third compartment 16 may have a lockable storage panel cap 18 and an antenna mount or holder 30 extending from an upper surface of the compartment 16. The lockable storage panel cap 18 lockably closes an aperture within the third storage compartment 16. A marker light 32 (e.g., red) may be embedded within the rearward portion, or rearward facing sidewall, of the third compartment 16. Each antenna holder 30 may support an antenna 48 extending vertically from the storage compartment. Each side step 28 may have a plurality of light emitting diode (LED) lights 42.

Figure 4:
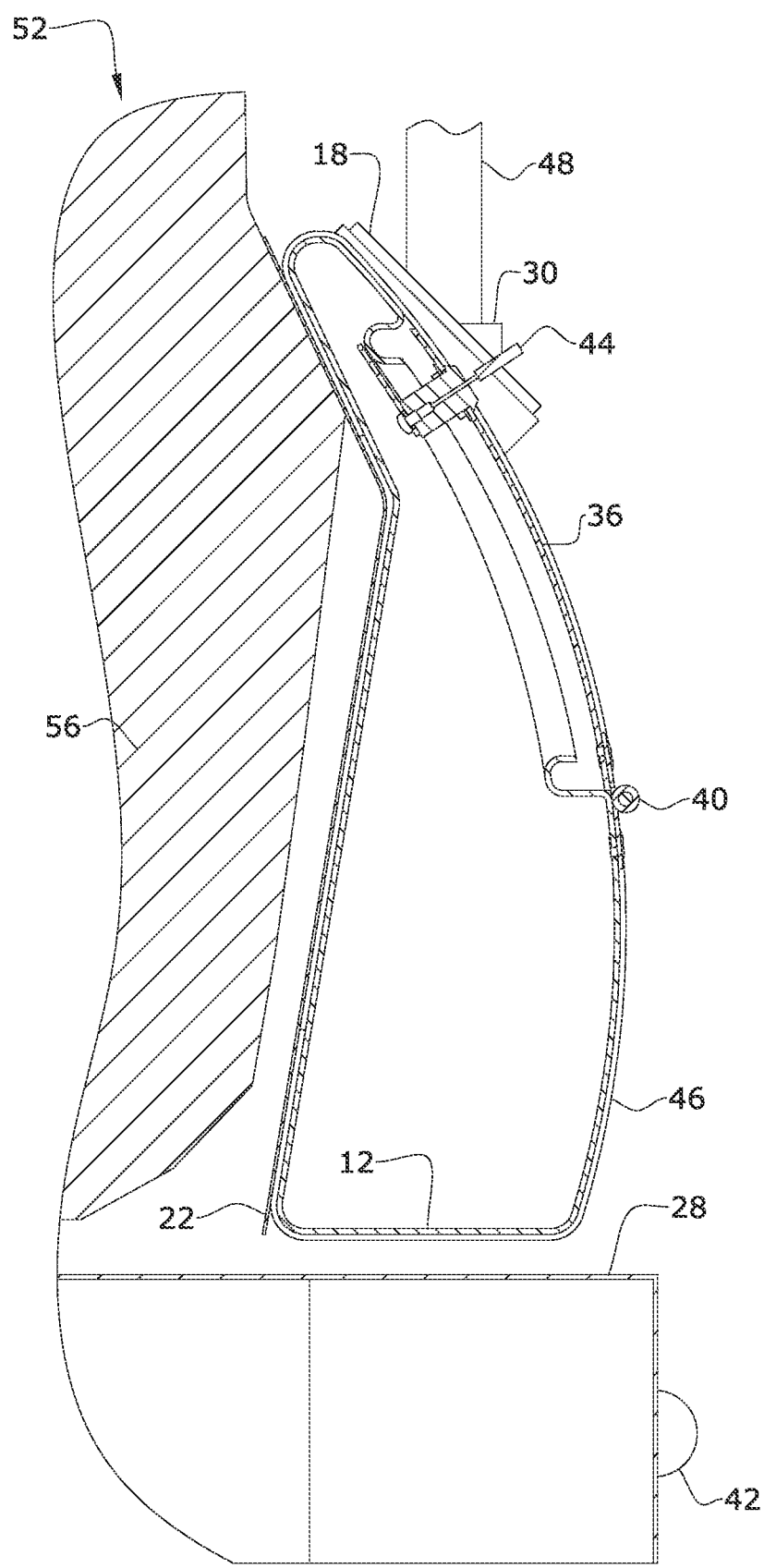
FIG. 4 is a sectional view taken along line 4-4 from FIG. 1.
Figure 5:
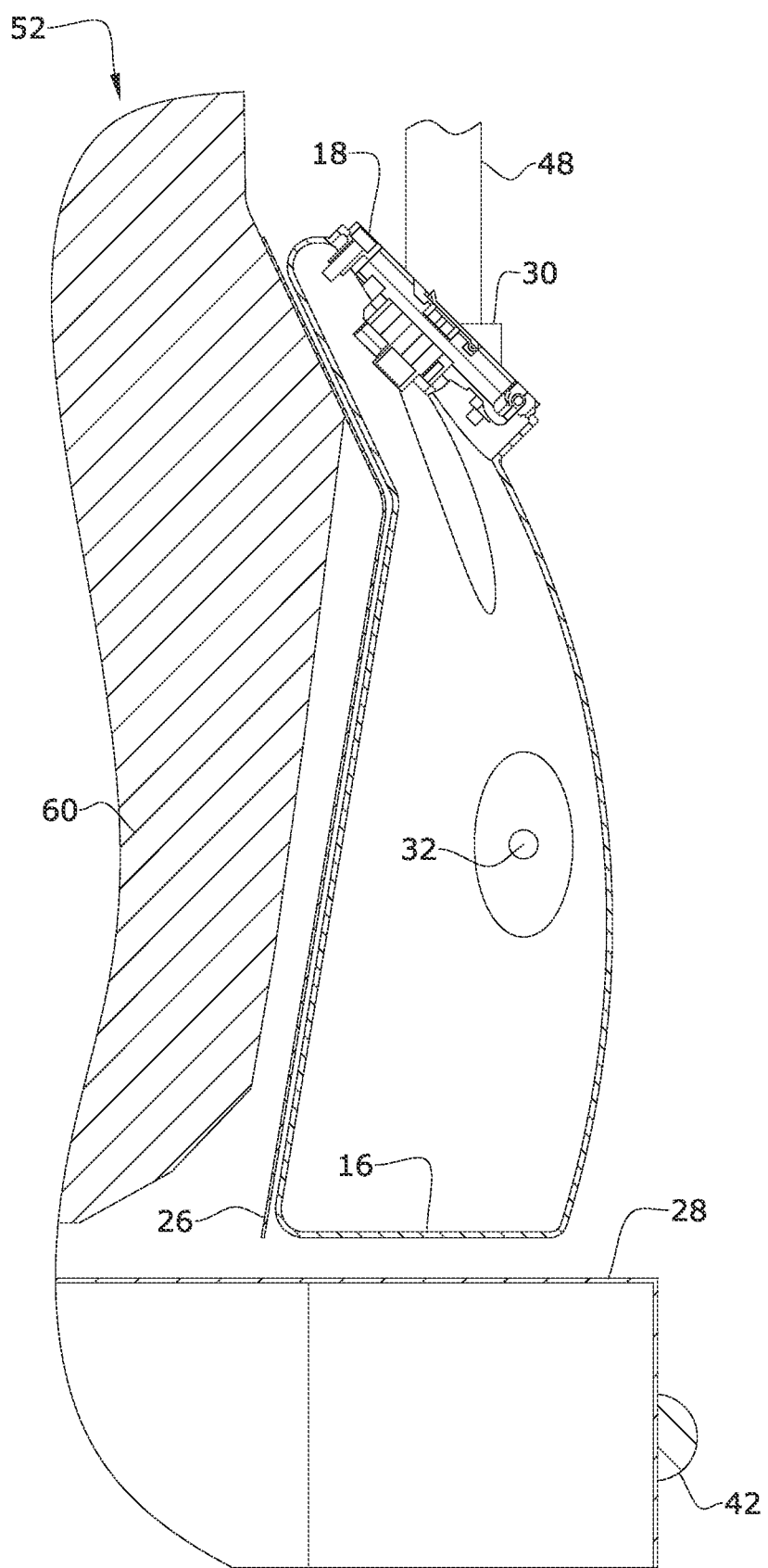
FIG. 5 is a sectional view taken along line 5-5 from FIG. 1.

As shown in FIGS. 1, 4, and 5, the storage assemblies 10, 50 may be attached to a truck 52 with the front fender piece 20 attached to a front fender 54, the front door piece 22 attached to a front door 56, the rear door piece 24 attached to a rear door 58, and the rear fender piece 26 attached to a rear fender 60, e.g., with attachment hardware (not shown) or adhesive.

It should be understood, of course, that the foregoing relates to exemplary embodiments of the invention and that modifications may be made without departing from the spirit and scope of the invention as set forth in the following claims.

What is claimed is:

1. A modular side storage assembly for use on an automotive body, comprising:
   a. at least one door storage compartment module having a first internal sidewall, a first horizontal base, and a curved first external sidewall rising therefrom to meet the first internal sidewall and extending forwardly to form a curved first forward facing sidewall, with a first rearward facing sidewall joining the first internal sidewall, the first horizontal base, and the first curved external sidewall;
   b. a hatch hingeably attached to the first curved external sidewall at an aperture therein; and
   c. at least one rear fender storage compartment module having a second internal sidewall, a second horizontal base, a second curved external sidewall rising therefrom to meet the second internal sidewall and extending rearwardly to form a curved second rearward facing sidewall; and a second forward facing sidewall joining the second internal sidewall, the second horizontal base, and the second curved external sidewall;
   wherein the first internal sidewall extends beyond the curved first forward facing sidewall.

2. The modular side storage assembly of claim 1, further comprising at least one front fender piece.

3. The modular side storage assembly of claim 1, further comprising a lighting device attached within the at least one door storage compartment module.

4. The modular side storage assembly of claim 1, further comprising one or more energy production devices.

5. The modular side storage assembly of claim 1, wherein the first internal sidewall conforms to an exterior of an automotive door and wherein the second internal sidewall conforms to an exterior of an automotive rear fender.

6. The modular side storage assembly of claim 1, further comprising a lockable storage panel cap removably attached to the at least one rear fender storage compartment module and an antenna mount extending upwardly from the at least one rear fender storage compartment.

7. The modular side storage assembly of claim 1, wherein the first curved external sidewall and the first horizontal base are coupled to the first internal sidewall with a pair of straps.

8. The modular side storage assembly of claim 1, wherein the curved first forward facing sidewall further comprises a marker light.

9. The modular side storage assembly of claim 1, wherein the curved second rearward facing sidewall further comprises a marker light.

10. The modular side storage assembly of claim 1, further comprising a side step with a plurality of LEDs embedded therein.

11. The modular side storage assembly of claim 1, further comprising at least one rear door storage compartment module having a third internal sidewall, a third horizontal base, and a third curved external sidewall rising therefrom to meet the third internal sidewall, with a third forward facing sidewall and a third rearward facing sidewall joining the third internal sidewall, the third horizontal base, and the third curved external sidewall; and a hatch hingeably attached to the third curved external sidewall at an aperture therein.

12. The modular side storage assembly of claim 11, wherein the third curved external sidewall and the third horizontal base are coupled to the third internal sidewall with a pair of straps.

13. The modular side storage assembly of claim 11, wherein the third internal sidewall extends beyond the third forward facing sidewall.

14. A modular side storage assembly for use on an automotive body comprising:
   a. two front fender pieces;
   b. two front door storage compartment modules having a first internal sidewall coupled to a first horizontal base and a curved first external sidewall rising from the first horizontal base to meet the first internal sidewall and extending forwardly to form a curved first forward facing sidewall with a marker light positioned therein, with a first rearward facing sidewall joining the first horizontal base, and the first curved external sidewall;
   c. two rear door storage compartment modules having a second internal sidewall coupled to a second horizontal base and a second curved external sidewall rising from the second horizontal base to meet the second internal sidewall, with a second forward facing sidewall and a second rearward facing sidewall joining the second horizontal base, and the second curved external sidewall;
   d. a hatch hingeably attached to each of the first and second curved external sidewalls at an aperture therein; and
   e. two rear fender storage compartment modules having a third internal sidewall, a third horizontal base, a third curved external sidewall rising therefrom to meet the third internal sidewall and extending rearwardly to form a curved third rearward facing sidewall with a marker light positioned therein; and a third forward facing sidewall joining the third internal sidewall, the third horizontal base, and the third curved external sidewall;
   f. a lockable storage panel cap removably attached to each rear fender storage compartment;
   g. an antenna mount extending upwardly from each rear fender storage compartment; and
   h. two side steps with a plurality of LEDs embedded therein.

* * * * *